United States Patent [19]

Umeda

[11] Patent Number: 4,848,957
[45] Date of Patent: Jul. 18, 1989

[54] COUPLING FOR PLASTIC TUBE

[75] Inventor: Katsuhiko Umeda, Tokyo, Japan

[73] Assignee: Jamco Corporation, Tokyo, Japan

[21] Appl. No.: 196,949

[22] Filed: May 20, 1988

[30] Foreign Application Priority Data

Jul. 4, 1987 [JP] Japan .......................... 62-102280[U]
Feb. 4, 1988 [JP] Japan ............................ 63-13091[U]

[51] Int. Cl.$^4$ .............................................. F16B 2/14
[52] U.S. Cl. .................................. 403/374; 403/341;
403/290; 24/122.3
[58] Field of Search ............... 403/341, 290, 373, 287,
403/374; 24/122.3, 115 A

[56] References Cited

U.S. PATENT DOCUMENTS

| | | | |
|---|---|---|---|
| 990,599 | 4/1911 | Sandell | 403/290 |
| 3,725,981 | 4/1973 | Pinckney | 403/341 X |
| 4,127,344 | 11/1978 | Kwiatkowski | 403/275 X |
| 4,373,832 | 2/1983 | Monteillet | 403/374 |

FOREIGN PATENT DOCUMENTS 491913 2/1919 France ............................... 403/373

Primary Examiner—Andrew V. Kundrat
Attorney, Agent, or Firm—Koda and Androlia

[57] ABSTRACT

A coupling comprising a tube made of plastic composite material to be used as a structural member and having an end portion formed with a plurality of acute cutouts, a fitting having a small-diameter front end portion and a bell-shaped tapering rear portion, and a bell-shaped sleeve having an inner wall surface of a shape corresponding to that of the tapering portion of the fitting. The end portion of the plastic tube is held between the fitting inserted into the end portion and the sleeve mounted on the outer periphery of the taper fitting, and a nut threadedly engaged with external threads of the fitting is tightened to assemble the fitting, the plastic tube and the sleeve as a unit.

2 Claims, 2 Drawing Sheets

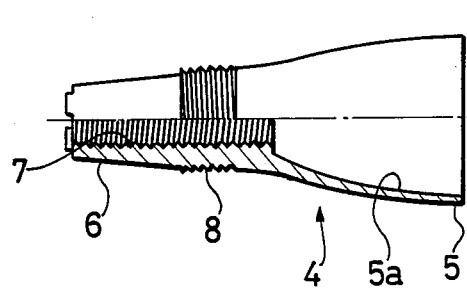
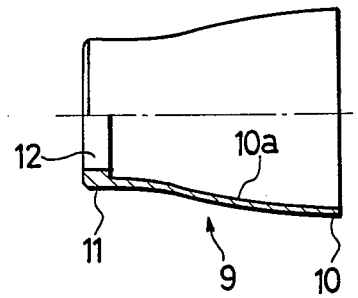
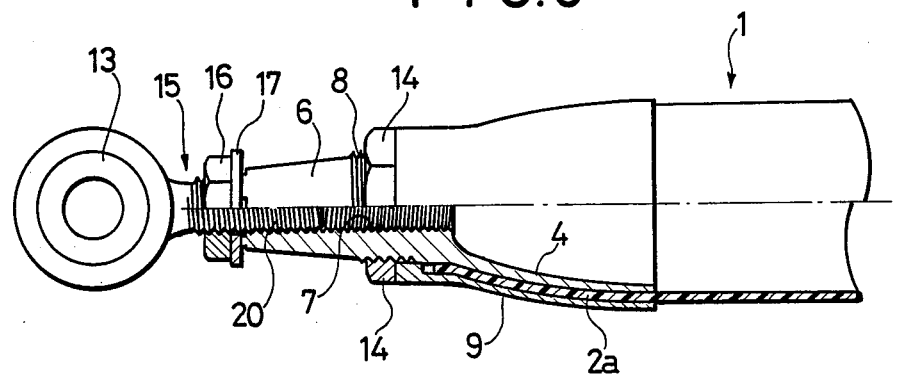
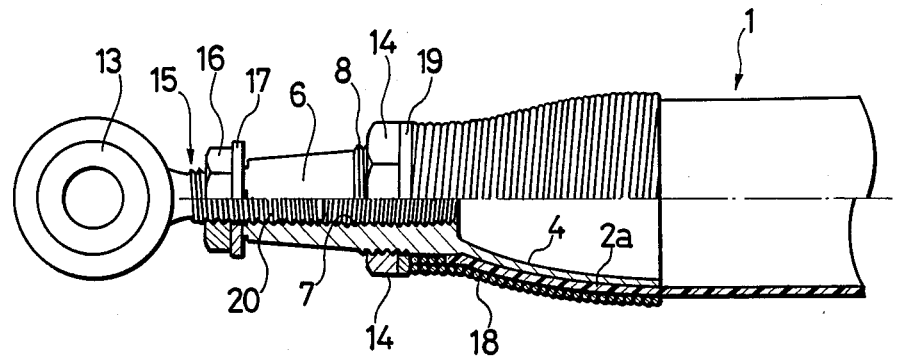

4,848,957

COUPLING FOR PLASTIC TUBE

BACKGROUND OF THE INVENTION

1. Field of the Invention

The present invention relates to a coupling adapted to be connected to an end portion of a tube made of plastic composite material to be used as a structural member in a structure or the like.

2. Description of the Prior Art

A conventional coupling means for coupling an end portion of a tube made of plastic composite material to be used as a structural member to another member includes a mechanical coupling means or a fastener such as a rivet, bolt and nut. However, in such a mechanical coupling means, when a stress such as a tensile stress is generated between the plastic tube and the other member connected thereto, a stress concentration is generated at a wall surface of the plastic tube at a position around a through fole in which the rivet or the bolt is inserted through the plastic tube, causing breakage of the plastic tube or a reduction in strength as the structural member. There exists another coupling means employing adhesive for bonding the plastic tube to the other member. However, this kind of coupling means has a problem of low and ununiformity of the adhesive strength.

SUMMARY OF THE INVENTION

Accordingly, it is an object of the present invention to provide a coupling designed to be connected to an end portion of a tube made of plastic composite material (which will be hereinafter referred to as a plastic tube) to be used as a structural member, which coupling has a large strength without the necessity of adhesive as a bonding means.

It is another object of the present invention to provide a coupling designed to be connected to the end portion of the plastic tube having acute cutouts, which coupling has a tapering portion for holding the end portion of the plastic tube.

It is a further object of the present invention to provide a coupling having a tapering portion which may firmly hold the end portion of the plastic tube by utilizing a wedge effect of the tapering portion.

It is a still further object of the present invention to provide a coupling employing a fiber reinforced plastic for a part of the coupling.

According to the present invention, there is provided a coupling for a plastic tube comprising the plastic tube having an end portion formed with a plurality of acute cutouts, a fitting having a small-diameter front end portion formed with a tapped hole for receiving a connecting rod and a bell-shaped tapering rear portion, and a bell-shaped sleeve having an inner wall surface of a shape corresponding to a tapering shape of the fitting, wherein the end portion of the plastic tube is held between the fitting inserted into the plastic tube and the bell-shaped sleeve mounted on the fitting through the end portion of the plastic tube.

In assembling the coupling of the present invention, the fitting is first inserted into the end portion of the plastic tube which end portion is formed with the acute cutouts. Then, the bell-shaped sleeve is mounted on the outer periphery of the end portion of the plastic tube. Then, a locking means such as a nut is tightened to the front end portion of the fitting to thereby draw the fitting toward the sleeve. As a result, the end portion of the plastic tube is taperingly deformed and held between the tapering portion of the fitting and the tapering portion of the bell-shaped sleeve, thus assembling these three members as a unit. Then, the connecting rod is connected to the coupling by threadedly engaging the former with the tapped hole of the fitting, thus reliably connecting the plastic tube with the other member.

BRIEF DESCRIPTION OF THE DRAWINGS

FIG. 4 is an elevational view, partly in section, of the fitting;

FIG. 5 is an elevational view, partly in section, of the bell-shaped sleeve;

FIG. 6 is an elevational view, partly in section, of a preferred embodiment of the coupling connected to the connecting rod; and FIG. 7 is an elevational view, partly in section, of another preferred embodiment of the coupling connected to the connecting rod.

DETAILED DESCRIPTION OF THE PREFERRED EMBODIMENTS

Figure 1:
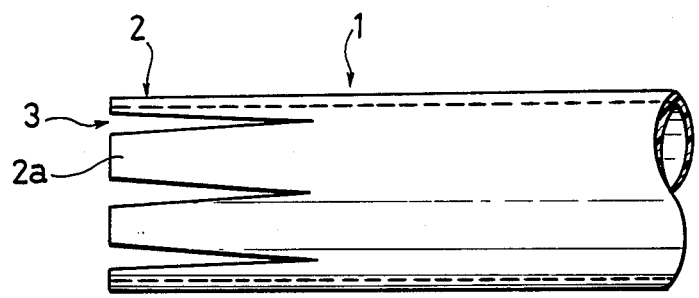
FIG. 1 is an elevational view of the end portion of the plastic tube.
Figure 2:
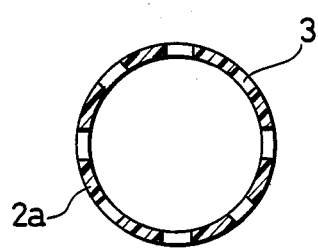
FIG. 2 is a left side view of FIG. 1.
Figure 3:
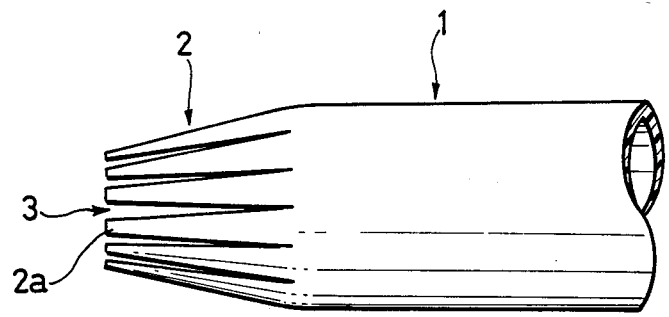
FIG. 3 is an elevational view of the end portion of the plastic tube under the taperingly deformed condition.

There will now be described a preferred embodiment of the present invention. FIG. 1 is an elevational view of an end portion 2 of a tubular member 1 made of plastic composite material, and FIG. 2 is an end view of the tubular member 1. The end portion 2 of the tubular member 1 is formed with a plurality of acute cutouts 3 extending in a longitudinal direction of the tubular member 1. The acute cutouts 3 are arranged at equal intervals over the circumference of the end portion 2 to form a plurality of lips 2a. The number of lips 2a formed to the end portion 2 may depend upon the size of the tubular member 1. As shown in FIG. 3, when a force is applied to the end portion 2 from the outer circumference toward the center thereof, the lips 2a are inwardly deformed in such a manner that each acute cutout 3 defined between the adjacent lips 2a is narrowed to form a tapering configuration of the end portion 2.

FIG. 4 is an elevational view, partly in section, of a fitting 4. The fitting 4 is made of aluminum alloy or the like, and has a bell-shaped configuration such that an outer diameter of a maximum-diameter rear end portion 5 of the fitting 4 is substantially equal to an inner diameter of the tubular member 1, and that a tapering portion 5a is formed between the rear end portion 5 and a minimum-diameter front end portion 6. The front end portion 6 is formed with internal threads 7 to be threadedly engaged with a bolt portion 2 of a connecting rod 15 which will be hereinafter described. Further, the fitting 4 is formed at its front portion with external threads 8 to be threadedly engaged with a lock nut 14 which will be hereinafter described.

FIG. 5 is an elevational view, partly in section, of a bell-shaped sleeve 9 designed to be fitted with the outer periphery of the fitting 4 through the end portion 2 of the tubular member 1. The bell-shaped sleeve 9 is made of aluminum alloy or the like, and has a bell-shaped configuration such that an inner diameter of a maximum-diameter rear end portion 10 of the sleeve 9 is substantially equal to an outer diameter of the tubular member 1, and that a tapering portion 10a is formed between the rear end portion 10 and a minimum-diameter front end portion 11. The tapering portion 10a of the sleeve 9 has a tapering angle equal to that of the tapering portion 5a of the fitting 4. The front end portion 11 of the sleeve 9 is formed with an opening 12 for inserting the front end portion 6 of the fitting 4 therethrough.

FIG. 6 shows an assembled condition of the tubular member 1, the fitting 4 and the sleeve 9 wherein the tubular member 1 is connected through a connecting rod 15 having a bearing 13 to another member (not shown).

First, the rear end portion 5 of the fitting 4 is inserted into the end portion 2 with the acute cutouts 3. Then, the bell-shaped sleeve 9 is fitted with the outer periphery of the end portion 2 of the tubular member 1 in such a manner that the opening 12 of the sleeve 9 is positioned near the external threads 8 of the fitting 4. Then, the nut 14 is threadedly engaged with the external threads 8 of the fitting 4, and is tightened to strongly hold the end portion 2 of the tubular member 1 between the tapering portion 5a of the fitting 4 and the tapering portion 10a of the sleeve 9 by a wedge effect.

Then, the connecting rod 15 having a connecting bearing 13 is threadedly engaged with the internal threads 7 formed in the end portion 6 of the fitting 4, and is fixed by an adjusting nut 16.

In this manner, a gap between the fitting 4 and the sleeve 9 is reduced by tightening the nut 14, and the end portion 2 of the tubular member 1 held between the fitting 4 and the bell-shaped sleeve 9 is gradually tapered in accordance with the tapering shapes of the fitting 4 and the sleeve 9, thus assembling the fitting 4, the end portion 2 of the tubular member 1 and the bell-shaped sleeve 9 as a coupling unit.

The connecting rod 15 to be connected to another member is connected to the coupling by threadedly engaging a bolt portion 20 of the rod 15 with the internal threads 7 of the front end portion 6 of the fitting 4. The connecting bearing 13 of the connecting rod 15 is formed with a through-hole to be engaged with another shaft member, for example.

In threadedly engaging the bolt portion 20 of the connecting rod 15 with the internal threads 7 of the front end portion 6 of the fitting 4, the adjusting nut 16 together with a washer 17 is engaged with the bolt portion 20, so as to adjust an engaging position of the connecting rod 15.

In this embodiment, the end portion of the plastic tubular member is coupled to the metal coupling by a large frictional force generated at the plural lips 2a of the end portion 2, thus receiving a load at a wide area of the end portion 2. Accordingly, when a tensile force is applied to the tubular member 1, there is hardly generated a stress at the end portion 2. Further, a stress distribution may be made uniform to thereby avoid a stress concentration at the coupling and improve a strength of the coupling.

Further, as the connecting rod is axially adjustably connected to the front end portion of the coupling, a connecting position of the end portion 2 of the tubular member 1 to be connected to another member may be easily adjusted.

Referring next to FIG. 7 which shows another preferred embodiment of the present invention, a fiber reinforced sleeve 18 is substituted for the bell-shaped sleeve 9 of the previous embodiment. The other parts are substantially the same as those of the previous embodiment, and are designated by the same reference numbers.

In the same manner as the previous embodiment, the rear end portion 5 of the fitting 4 is inserted into the end portion 2 having the plural acute cutouts 3 of the tubular member 1. Then, a roving of carbon fiber impregnated with epoxy resin is wound around the outer periphery of the end portion 2 of the tubular member 1 substantially perpendicularly thereto to thereby inwardly deform the lips 2a of the end portion 2 along the tapering shape of the fitting 4. Then, the epoxy resin is cured to form a bell-shaped fiber reinforced plastic sleeve 18. Then, the nut 14 toghether with a washer 19 is threadedly engaged with the external threads 8 formed at the front end portion 6 of the fitting 4, thereby strongly holding the end portion 2 tapered between the fitting 4 and teh bell-shaped fiber reinforced sleeve 18.

Further, similarly to the previous embodiment, the connecting rod 15 having the connecting bearing 13 is threadedly engaged with the internal threads 7 formed in the front end portion 6 of the fitting 4, and is fixed by the adjusting nut 16. The gap between the fitting 4 and the sleeve 18 is reduced by tightening the nut 14, and the end portion 2 of the tubular member 1 held between the fitting 4 and the fiber reinforced sleeve 18 is gradually tapered in accordance with the tapering shapes of the fitting 4 and the sleeve 18. Thus, the end portion 2 of the tubular member 1 is firmly held between the fitting 4 and the fiber reinforced sleeve 18 as shown in FIG. 7.

Further, also similarly to the previous embodiment, the length of the engaged portion of the connecting rod 15 with the internal threads 7 of the fitting 4 is suitably adjusted by the adjusting nut 16.

In the second preferred embodiment, as the sleeve 18 is formed by curing the epoxy resin impregnated in the carbon fiber, the sleeve 18 is lightened in weight. When the fitting 4 is firmly coupled to the sleeve 18, the sleeve 18 tends to be expanded outwardly to generate a tensile force against the carbon fiber of the sleeve 18. However, the carbon fiber has a large resistance against the tensile force. Accordingly, the strength of the coupling may be increased.

As described above, the coupling for the plastic tube according to the present invention may effect reliable connection without the necessity of adhesive. Furthermore, as the coupling has a large connection area for connecting with the tube, power transmission may be smoothly carried out, and no stress concentration is generated. As the tightening force to be applied to the end portion of the tube is increased in proportion to a tensile force to be applied, and the frictional force is increased, the power transmission may be reliably effected. Further, upon application of a compressive force to the coupling, the frictional engagement between the sleeve and the end portion of the tube is increased to thereby ensure the power transmission.

In using the bell-shaped sleeve of the first embodiment shown in FIGS. 5 and 6, the assembling operation of the coupling may be simplified to thereby reduce the cost. On the other hand, in using the fiber reinforced sleeve of the second embodiment shown in FIG. 7, the coupling may be made light in weight and strong.

What is claimed is:

1. A coupling for a plastic tube comprising:
   a plastic tube having an end portion formed at its circumference with a plurality of acute cutouts;

a metal fitting adapted to be inserted into said plastic tube, said fitting having a small-diameter front end portion and a bell-shaped tapering rear portion, said front and end portion being formed with internal threads to be threadedly engaged with a connecting rod and being formed with external threads to be threadedly engaged with a lock nut, said bell-shaped tapering rear portion having a maximum-diameter rear end having an outer diameter sustan-tially equal to an inner diameter of said plastic tube; and a bell-shaped sleeve adapted to be mounted on said fitting and having an inner wall surface of a shape corresponding to that of said bell-shaped tapering rear portion of said fitting; wherein:

said end portion of said plastic tube is held between said tapering rear portion of said fitting and said inner wall surface of said bell-shaped sleeve, said lock nut threadedly engaged with said external threads of said fitting is tightened to assemble said fitting, said plastic tube and said sleeve as a unit, and said bell-shaped sleeve comprises a fiber reinforced plastic sleeve formed by winding carbon fiber impregnated with thermal setting resin around said end portion of said plastic tube into which said tapering rear end of said fitting has been inserted, and then curing said thermal setting resin, thereby said fiber reinforced sleeve is formed with a tapering portion having a shape corresponding to said tapering rear poortion of said fitting.

2. The coupling as defined in claim 1, wherein said connecting rod for connecting said plastic tube to another member is threadedly engaged with said internal threads formed at said front end portion of said fitting.

* * * * *